United States Patent
Vierthaler

(10) Patent No.: US 7,133,478 B2
(45) Date of Patent: Nov. 7, 2006

(54) DEVICE AND METHOD FOR DETECTING AND SUPPRESSING NOISE

(75) Inventor: Matthias Vierthaler, Freiburg (DE)

(73) Assignee: Micronas GmbH, Freiburg (DE)

( * ) Notice: Subject to any disclaimer, the term of this patent is extended or adjusted under 35 U.S.C. 154(b) by 869 days.

(21) Appl. No.: 10/115,267

(22) Filed: Apr. 2, 2002

(65) Prior Publication Data

US 2002/0141519 A1    Oct. 3, 2002

(30) Foreign Application Priority Data

Apr. 2, 2001  (DE) ................................ 101 16 358

(51) Int. Cl.
*H04B 1/10* (2006.01)

(52) U.S. Cl. ................. 375/350; 375/285; 381/94.1

(58) Field of Classification Search ................ 375/346, 375/349–350, 229, 285; 381/15, 94.1, 94.7, 381/98; 370/208, 210; 358/188; 455/307, 455/222, 266; 708/300
See application file for complete search history.

(56) References Cited

U.S. PATENT DOCUMENTS

| | | | |
|---|---|---|---|
| 4,101,849 A | 7/1978 | Blackmer et al. | 333/14 |
| 4,136,314 A | 1/1979 | Blackmer et al. | 328/167 |
| 4,143,333 A | 3/1979 | Jacobsen et al. | 330/149 |
| 4,208,547 A | 6/1980 | Simeau | 179/1 |
| 4,283,601 A * | 8/1981 | Nakajima et al. | 704/233 |
| 4,398,220 A * | 8/1983 | Satoh | 348/725 |
| 4,539,526 A | 9/1985 | Davis | 330/144 |
| 4,622,520 A | 11/1986 | Kuroda | 329/112 |
| 4,736,163 A | 4/1988 | Berkhout et al. | 328/162 |
| 4,975,953 A | 12/1990 | Kennedy et al. | 381/13 |
| 5,261,004 A | 11/1993 | Manlove et al. | 381/15 |
| 5,479,440 A | 12/1995 | Esfahani | 375/346 |
| 5,566,365 A * | 10/1996 | Yokoya et al. | 455/307 |
| 5,572,163 A * | 11/1996 | Kimura et al. | 327/553 |
| 5,699,424 A * | 12/1997 | Hirano | 379/406.11 |
| 5,796,842 A | 8/1998 | Hanna | 381/4 |
| 6,160,752 A | 12/2000 | Kohno | 382/190 |
| 6,347,146 B1 * | 2/2002 | Short et al. | 381/15 |
| 6,522,626 B1 * | 2/2003 | Greenwood | 370/208 |
| 2003/0050786 A1 * | 3/2003 | Jax et al. | 704/500 |

FOREIGN PATENT DOCUMENTS

| | | |
|---|---|---|
| DE | 689 22 086 | 12/1989 |
| DE | 4244630 | 7/1993 |
| DE | 19854073 | 6/2000 |
| GB | 1593834 | 7/1981 |

* cited by examiner

Primary Examiner—Jean B Corrielus
(74) Attorney, Agent, or Firm—O'Shea, Getz & Kosakowski, P.C.

(57) ABSTRACT

A device for detecting and suppressing noise includes a noise detection device that receives and processes an input signal to determine if the input signal contains noise and provides a detected noise signal indicative of whether or not noise is detected in the input signal. A noise filter receives the input signal and when the detected noise signal does not indicate the presence of noise the noise filter provides an output signal equal to input signal. When the detected noise signal indicates the presence of noise the noise filter processes the input signal through a first filter to provide a filtered signal such that the output signal is equal to the filtered signal. The noise filter comprises a control circuit that receives the input signal and the filtered signal and in response dynamically adjusts a cut-off frequency control signal that controls a cut-off frequency of the first filter.

27 Claims, 3 Drawing Sheets

DEVICE AND METHOD FOR DETECTING AND SUPPRESSING NOISE

BACKGROUND OF THE INVENTION

The invention relates to a device and method for detecting noise in an electronic device, especially noise in impulse form, in a signal with a bandwidth-limited useful component, and a device and method for suppressing such noise.

Probably the most important example of this type of bandwidth-limited signal is an audio signal. The useful component of such an audio signal lies within the audible frequency range of human hearing, or approximately 40 Hz to 16,000 Hz. However, noise impulses that propagate through a line along with the useful component may have frequency components that extend beyond the audible frequency range.

Noise impulses in such an audio signal may occur for a number of reasons. For example, electrical equipment in the vicinity of a radio receiver may become noticeable as noise, such as ignition pulses from a vehicle engine. In addition, processing of the audio signal itself (e.g., from clipping of a digital signal or overflow in a digital demodulator) may result in impulse noise.

To efficiently implement noise suppression, it is first necessary to reliably detect the noise. A variety of techniques have been proposed for detecting and eliminating noise components in a signal.

U.S. Pat. No. 5,479,440 discloses a technique that is based on conversion of time data from the signal to be cleared of noise to the frequency domain, the determination of a threshold below which all frequency components are canceled, and the back-conversion of the spectrum obtained to the time domain. This technique requires a double fast Fourier transform (FFT) and is thus complex and expensive, and accordingly relatively poorly suited for use in devices intended for a broad range of consumers.

U.S. Pat. No. 4,622,520 discloses a method for eliminating noise from an audio signal modulated from a high-frequency carrier. In this method, the strength of the signal component is compared with that of the carrier, and signal components that are stronger than the carrier are detected as noise and suppressed. However, this technique cannot be applied to signals in the baseband since no carrier is available there as a reference for comparison. In addition, the application of this technique to digital signals is problematic due to the required high sampling rates.

U.S. Pat. No. 4,143,333 proposes detecting noise impulses in an audio signal using a differentiating filter. For the duration of the noise the signal is blanked out. This type of noise detection directly from the audio signal is error-prone because it must first be ensured that a loud, high tone in the audio signal is not erroneously detected as impulse noise. In addition, there is the danger that noise will go undetected and thus unattenuated if the noise detection threshold is too high.

Therefore, there is a need for a technique of detecting and suppressing noise in a bandwidth-limited signal that is relatively simple and inexpensive to implement, yet provides reliable detection and suppression.

SUMMARY OF THE INVENTION

A device for noise detection includes a first filter for separating a spectral component lying outside the bandwidth of the useful-signal component of an input signal, and a comparator for comparing the power of this separated spectral component with a limit and for detecting noise when the power exceeds the limiting value.

The limit is suitably derived from a power mean value of the input signal. This allows the sensitivity of the noise detection to be automatically adjusted to the level of the input signal. The power mean value may be determined for the power of the entire frequency spectrum of the input signal or for the power of the spectral component separated from the input signal.

The lower cut-off frequency of the first filter lies above the upper cut-off frequency of the bandwidth-limited input signal. When the bandwidth-limited input signal is an audio signal the first filter appropriately has a lower cut-off frequency that, depending on the base audio standard, may lie in the range between 4 kHz and 24 kHz. The upper cut-off frequencies may be, for example, for signals of telephone quality in the 4 kHz range, around 15 kHz for TV audio signals, around 22.05 kHz for audio CD(s), and around 24 kHz for digital audio. Depending on the type of audio signal, a lower cut-off frequency for the first filter may be selected just above the cut-off frequency of the input signal. The first filter may be designed as a bandpass filter with an upper cut-off frequency in the range 1.5 times to 2 times the lower cut-off frequency.

A device for noise suppression in a bandwidth-limited signal may include a device for noise detection of the above-defined type as well as a noise elimination filter with a transmission characteristic controllable by the detection result provided by the detection device.

In the event no noise is detected, the noise elimination filter is transmissive. When noise is detected, the noise elimination filter may assume a low-pass filter characteristic. In the following discussion, this is also called the first transmission characteristic, as opposed to the second transmission characteristic applied in the event of no detection of noise. The corner frequency of the first transmission characteristic or the low-pass characteristic is readjusted by a control circuit for the upper cut-off frequency of the input signal. Preferably, this adjustment occurs by having the power of the low-pass-filtered signal converge on a predetermined percentage of the power of the unfiltered signal, appropriately between 50% and 95%, preferably around 85%.

The noise elimination filter with a controllable transmission characteristic may be constructed out of a first controllable weighting element for weighting the signal with the controllable factor and, in parallel to this element, a series circuit with a second controllable weighting element with a second filter.

Preferably, a ramp generator is provided to control the two weighting elements with two weighting factors such that the sum of the two weighting factors is constant. When a noise is detected, a ramp generator of this type enables progressive, gradual, and thus listener-audible switching between two transmission characteristics of the noise elimination filter.

In one embodiment, a delay element is provided between the noise detection device and the noise elimination filter.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
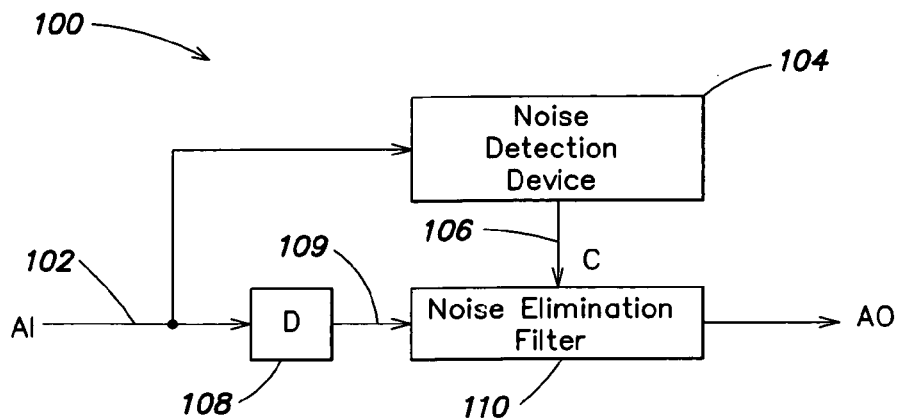
FIG. 1 is a block diagram illustration of a noise suppression device.

FIG. 1 is a block diagram of a device 100 for noise suppression of an audio input signal on a line 102. The device 100 includes a noise detection device 104 that receives the audio signal to be cleared of noise, and delivers an output signal on a line 106 that indicates the presence or absence of a noise. A delay element 108 receives the audio signal on the line 102, and provides a delayed audio signal on a line 109 to a noise elimination filter 110. The noise elimination filter 110 is switchable between two transmission characteristics as controlled by the output signal on the line 106. In a first state, the noise elimination filter 110 operates as a low-pass characteristic for filtering out the impulse noises. A second state of the noise elimination filter 110 corresponds to an essentially unchanged transmission of the delayed audio signal on the line 109 through the noise elimination filter 110.

Figure 2:
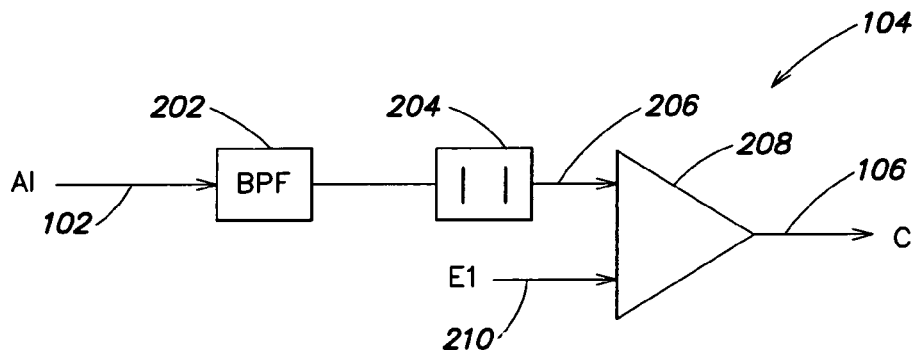
FIG. 2 is a block diagram illustration of a first embodiment of a noise detection device.

FIG. 2 is a block diagram of a first embodiment of the noise detection device 104. The noise detection device 104 includes a bandpass filter 202, which receives the audio input signal on the line 102. The lower corner frequency of the bandpass filter 202 lies above an upper cut-off frequency of the audio signal on the line 102. Therefore, when the bandwidth of the audio signal is limited to a maximum of 15 kHz, the lower cut-off frequency of the bandpass filter 202 may be about 17 kHz. A suitable value for the upper cut-off frequency of the bandpass filter 202 may be about 31 kHz.

When the audio signal on the line 102 has impulse noise, its spectrum temporarily has a significant power component outside the intended useful-signal bandwidth, in this example, 15 kHz. The noise component traverses the bandpass filter 202 and reaches an absolute-value circuit 204, whose output signal on a line 206 is proportional to the power of the signal received at its input. The output of the absolute-value circuit 204 on the line 206 is input to a comparator 208, which also receives a fixed limit signal value E1 on a line 210. The comparator 208 provides the noise detection signal on the line 106, which assumes one of two different values depending on whether the power measured by the absolute-value circuit 204 of the noise signal component is greater or less than the threshold value E1 on the line 210.

For simplicity, it may be assumed that the output signal of the comparator 208 on the line 106 has a value of one in the event of a noise, and otherwise has the value zero, with the understanding that this assignment of numerical values is purely arbitrary.

Figure 3:
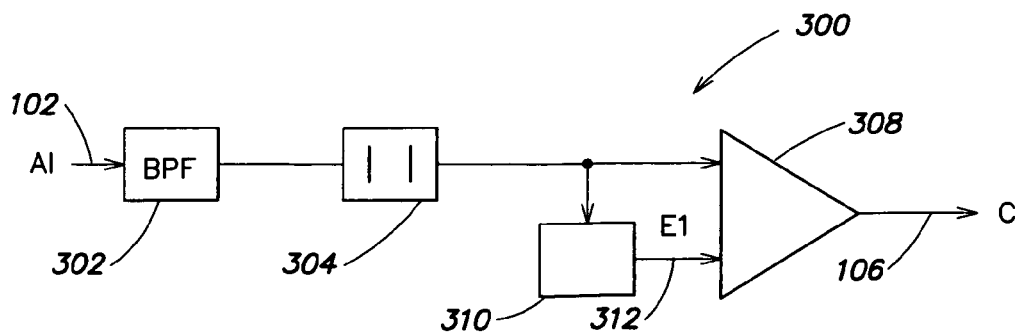
FIG. 3 is a block diagram illustration of a second embodiment of a noise detection device.

FIG. 3 illustrates a second embodiment 300 of the noise detection device 104 of FIG. 1. Similar to the embodiment of FIG. 2, the embodiment in FIG. 3 also includes a bandpass filter 302, an absolute-value circuit 304, and a comparator 308. In addition, an averaging circuit 310 is provided whose input is connected to the output of the absolute-value circuit 304, and whose output on a line 312 is connected to the second input of the comparator 308. The averaging circuit 310 generates a variable mean value of the signal from the absolute-value circuit 304, and sends this mean value multiplied by a weighting factor value N1 (N1<1) as the limit signal E1 on the line 312 to the comparator 308.

The averaging circuit 310 adjusts the threshold value E1 on the line 312 over time with the mean amplitude of the noise signal component transmitted by the bandpass filter 302. When the audio signal on the line 102 contains only a small power component outside its useful bandwidth, the threshold value E1 on the line 312 decreases with time, while the sensitivity of the noise detection device 104 increases. However, when the audio signal on the line 102 continues to be rich in high-frequency spectral components which, if they continue to be present, by definition cannot represent impulse noises, the sensitivity of the noise detection device 104 is automatically reduced. This reduces the likelihood of erroneously detecting an intensive, continuous high-frequency signal as noise that might be contained in the audio signal on the line 102 due to, for example, prior digital processing.

Instead of connection to the output of the absolute-value circuit 304, the input of the averaging circuit 310 may also be connected to the input of the bandpass filter 302 to generate a mean value of the power of the audio signal on the line 102. In this type of embodiment, the threshold value E1 on the line 312 follows the mean power value of the audio signal on the line 102. That is, the noise detection becomes more sensitive as the amplitude of the audio signal on the line 102 decreases. Given a quiet audio signal in which even noises of lesser amplitude become audible, a more sensitive detection and thus a more sensitive suppression becomes possible than is the case given a relatively loud signal. On the other hand, given a loud signal only those noises are detected that are intensive enough to become noticeably objectionable to a listener.

Figure 4:
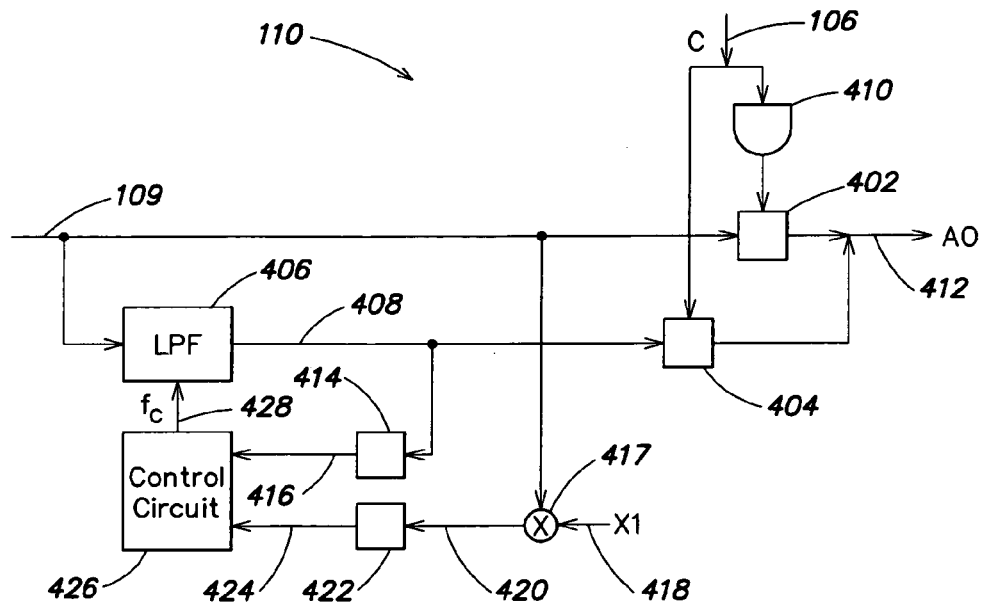
FIG. 4 is a block diagram illustration of a first embodiment of a noise elimination filter.

FIG. 4 illustrates a first embodiment of the noise elimination filter 110 of FIG. 1. The noise elimination filter 110 includes two switches 402, 404. The switch 402 receives the delayed audio signal on the line 109. A low pass filter 406 also receives the delayed audio on the line 109 and provides a low pass filtered signal on a line 408 to the second switch 404. Both switches 402, 404 are controlled by the noise detection signal on the line 106. The second switch 404 is responsive to the noise detection signal on the line 106, while the first switch 402 is connected to the noise detection signal on the line 106 through an inverter 410. As a result, when one of the two switches 402, 404 is open the other switch is closed, and vice versa. In the event no noise is detected, the switch 402 is closed and the audio signal passes through the switch 402 and is output on a line 412. When a noise is detected, the switch 404 is closed and the low pass filtered signal on the line 408 is output on the line 412.

Referring again to FIG. 1, the delay time for the audio signal in the delay element 108 is chosen as a function of the reaction time of the noise detection device 104 such that, upon detection of noise, the noise detection signal C on the line 106 changes state before the delayed audio signal arrives at the noise elimination filter 110. This ensures that even the beginning of a noise impulse is filtered.

Referring again to FIG. 4, the noise eliminator filter 110 also includes a first absolute value detector 414 that receives the filtered signal on the line 408 and provides a first absolute value signal indicative of the absolute value on a line 416. A multiplier 417 receives the delayed audio signal on the line 109 and a constant value X1 on a line 418, and provides the resultant product signal on a line 420. The product signal on the line 420 is input to a second absolute value detector 422 that provides a second absolute value signal indicative thereof on a line 424. The constant value X1 on the line 418 may be in the range of about 0.5 to 0.9, and preferably about 0.85. The absolute value signals are indicative of power.

The noise elimination filter 110 also includes a control circuit 426 that provides a cut-off frequency control signal $f_c$ on a line 428 to the low pass filter 406. The control signal $f_c$ sets the lower cut-off frequency for the low pass filter 406.

The control circuit 426 includes a comparator (not shown) that cyclically performs a comparison of the signals from the absolute-value detectors 414, 422. When the output level of the absolute-value detector 422 is larger, this indicates that the output power of the low-pass filter 406 is less than X1 times the input power. In this case, the control circuit 426 increases the value of the corner frequency $f_c$ of the low-pass filter 406 by a predetermined increment d1 to increase the transmission bandwidth of the low-pass filter 406 and thus its output power. When the level of the absolute-value detector 414 is larger, the value of the corner frequency $f_c$ is reduced by the same increment d1.

When the audio signal has only few high-frequency components and the frequency components of an impulse noise lying in the upper audible range of the frequency spectrum are especially noticeable to the listener, the dynamic adjustability feature of the corner frequency $f_c$ allowing the frequency to be reduced enables impulse noises to be effectively suppressed and frequency components of the noise in the audible frequency range to be effectively suppressed as well. However, when the audio signal on the line 102 has a large number of high-frequency components, the value of the corner frequency $f_c$ on the line 428 is shifted upward so that the high-frequency components of the audio signal essentially pass through the low-pass filter 406 and are preserved. In this case, while the spectral components of the noise extending into the same frequency range are not suppressed to the same degree as they would be if the corner frequency $f_c$ were lower, nevertheless this factor generally does not become noticeable as noise since these spectral components are masked by the audio signal.

Figure 5:
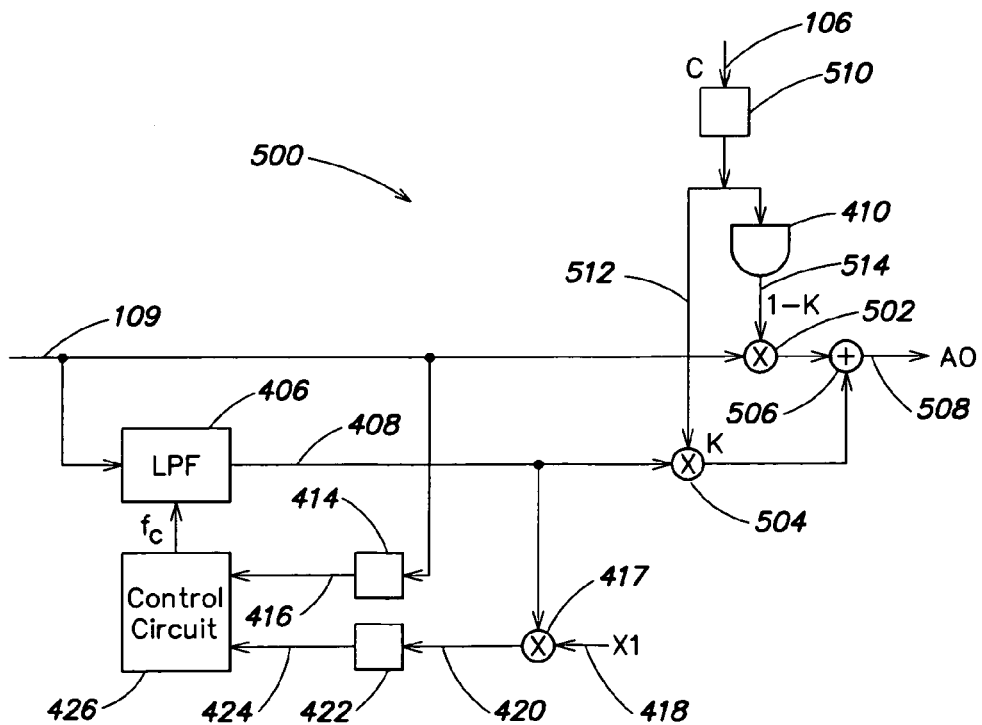
FIG. 5 is a block diagram illustration of a second embodiment of a noise elimination filter.

FIG. 5 illustrates an alternative embodiment 500 of the noise elimination filter 110 of FIG. 1. The elements already described in FIG. 4 and designated by the same reference numbers in FIG. 5 are not described again in the interest of brevity. In the noise elimination filter 500 of FIG. 5, the switches are replaced by weighting/multiplier elements 502, 504 that are connected through an adding element 506, which provides an output signal on a line 508. The inverter 410 is an analog inverter, and a ramp generator 510 is connected between the signal on the line 106 and the weighting elements 502, 504. The ramp generator 510 provides an output signal K on a line 512.

Figure 6:
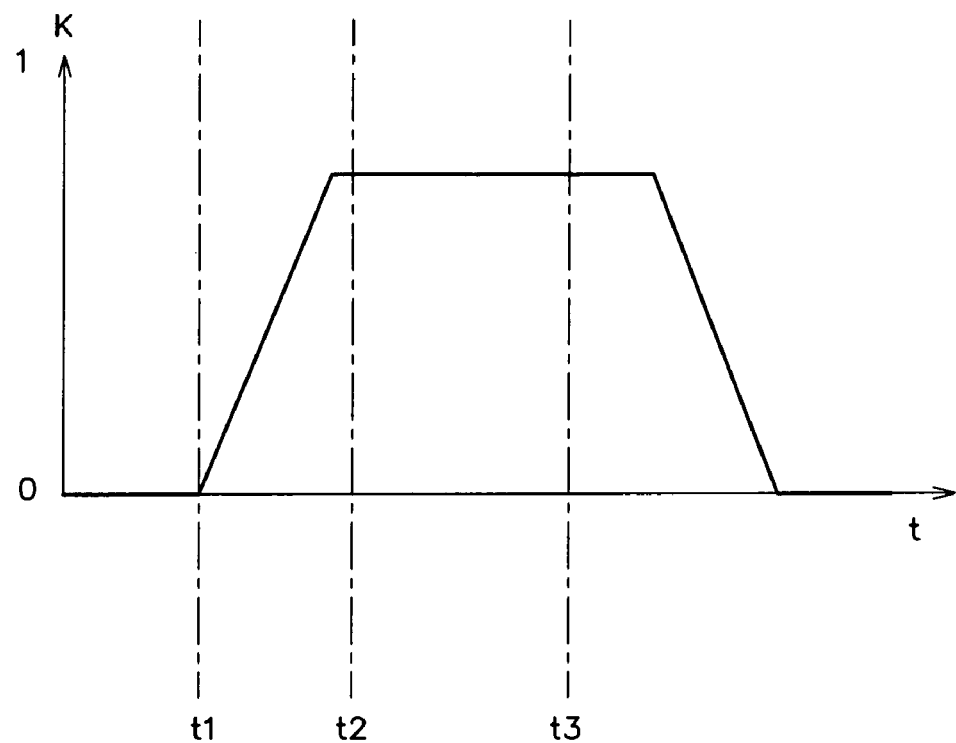
FIG. 6 is a graph of an output signal from a ramp generator associated with the noise elimination filter illustrated in FIG. 5.

FIG. 6 is a graph that illustrates the characteristic of the output signal K on the line 512 as a function of time when noise is detected. At time $t_1$ the onset of a noise is detected and the noise detection signal on the line 106 changes its level to indicate the presence of noise. In response, the output signal K on the line 512 begins to rise linearly from 0 to 1. Therefore, the weighting factor by which the weighting element 504 multiplies the low pass filtered signal on the line 408 changes linearly over time from 0 to 1. The weighting factor (1−K) on a line 514 applied by the weighting element 502 to the unfiltered audio signal on the line 109 moves from 1 toward 0. Shortly before the delayed audio signal on the line 109 is input to the filter 500 at time $t_2$, the switch-over is completed so that the delayed audio signal on the line 109 passes completely through the low pass filter 406. No noise is detected at time $t_3$, and the level of the noise detection signal C on the line 106 changes again. After a time interval that takes into account the delay of the signal in the delay element 108 (FIG. 1), the ramp generator 510 begins to generate a ramp declining from 1 to 0, in the course of which the transmission characteristic of the noise elimination filter 500 gradually returns from that of low-pass filter to complete transmission.

The noise detection device 104 described with reference to FIGS. 2 and 3 may be employed in connection with other types of noise elimination filters 110. For example, in one embodiment of the noise elimination filter 110, the low-pass filter 406 and its control circuit 426 may be eliminated, and instead, the input of the switch 404 or of the multiplier 504 may be connected to ground to respond to noise by simply temporarily blanking out the delayed audio signal in the case of noise. Another approach may be to connect that input of the switch 404 or the multiplier 504 to the output of a sample-and-hold circuit, which for the duration of the noise constantly delivers the instantaneous value of the audio signal as the output level that this signal had before the noise began. These two variants enable suppression of single, spot noises. However, when noises last several milliseconds or occur in rapid succession, these embodiments may result in dropouts in the audio signal that are objectionable to the listener. For this reason, the noise elimination filters 110 described in FIGS. 4 and 5 are preferred.

Although the present invention has been shown and described with respect to several preferred embodiments thereof, various changes, omissions and additions to the form and detail thereof, may be made therein, without departing from the spirit and scope of the invention.

The invention claimed is:

1. A device for detecting and suppressing noise, comprising:
   a noise detection device that receives and processes an input signal to determine if the input signal contains noise and provides a detected noise signal indicative of whether or not noise is detected in the input signal; and
   a noise filter that receives the input signal and when the detected noise signal does not indicate the presence of noise the noise filter provides an output signal equal to the input signal, and when the detected noise signal indicates the presence of noise the noise filter processes the input signal through a first filter to provide a filtered signal such that the output signal is equal to the filtered signal, wherein the noise filter comprises a control circuit that receives the input signal and the filtered signal and in response dynamically adjusts a cut-off frequency control signal that controls a cut-off frequency of the first filter.

2. The device of claim 1, wherein the noise detection device comprises:
   a bandpass filter that receives the input signal and provides a bandpassed signal;
   a detector that receives the bandpassed signal and provides a detected value signal; and
   a comparator that receives the detected value signal and a threshold signal and provides the detected noise signal indicative thereof.

3. The device of claim 2, further comprising:
   an averaging unit that receives the detected value signal and provides the threshold signal.

4. The device of claim 1, wherein the first filter comprises:
a low pass filter having a dynamically adjustable cut-off frequency, and that receives and filters the input signal to provide the filtered signal.

5. The device of claim 4, wherein the noise filter further comprises:
a first detector that receives the filtered signal and provides a first detected value signal;
a second detector that receives the input signal and provides a second detected value signal; and
a comparator that receives the first detected value signal and the second detected value signal and provides the cut-off frequency control signal.

6. The device of claim 4, wherein the noise filter further comprises:
a first multiplier that receives and multiplies the input signal and a multiplier value less than one, and provides a product signal indicative thereof to the control circuit.

7. The device of claim 1, wherein the first filter comprises:
means responsive to the cut-off frequency control signal, for attenuating signal components beyond the bandwidth of useful signal components within the input signal, and for providing the filtered signal.

8. The device of claim 7, wherein the means for attenuating comprises a low pass filter having a dynamically adjustable cut-off frequency at about 15 kHz.

9. The device of claim 8, wherein the noise detection device further comprises:
a bandpass filter that receives the input signal and provides a bandpassed signal;
a detector that receives the bandpassed signal and provides a detected value signal; and
a comparator that receives the detected value signal and a threshold signal and provides the detected noise signal indicative thereof.

10. The device of claim 9, wherein the bandpass filter has a pass band located between about 17 kHz and 31 kHz.

11. The device of claim 6, wherein the noise filter further comprises a ramp circuit that provides a smooth transition of the output signal when switching between the input signal and the filtered signal.

12. The device of claim 2, wherein the detector comprises an absolute value detector.

13. The device of claim 5, wherein the first detector further comprises a first absolute value detector and the second detector comprises a second absolute value detector.

14. A device for detecting and suppressing noise, comprising:
means for processing an input signal to determine if the input signal contains noise, and for providing a detected noise signal indicative of whether or not noise is detected in the input signal; and
means responsive to the input signal and the detected noise signal, for providing an output signal equal to the input signal when the detected noise signal does not indicate the presence of noise, for filtering the input signal to provide a filtered signal such that the output signal is equal to the filtered signal when the detected noise signal indicates the presence of noise, wherein the means for filtering comprises means responsive to the input signal and to the filtered signal, for dynamically adjusting a cut-off frequency control signal that controls a cut-off frequency of the means for filtering.

15. The device of claim 14, wherein the means for processing comprises:
a bandpass filter that receives the input signal and provides a bandpassed signal;
a detector that receives the bandpassed signal and provides a detected value signal indicative of the detected value of the bandpassed signal; and
means responsive to the detected value signal and a threshold signal, for providing the detected noise signal indicative of whether or not noise is detected in the input signal.

16. The device of claim 15, further comprising:
an averaging unit that receives the detected value signal and provides the threshold signal.

17. The device of claim 14, wherein the means for filtering comprises:
a low pass filter having a dynamically adjustable cut-off frequency, and that receives and filters the input signal to provide the filtered signal.

18. The device of claim 17, wherein the means for filtering further comprises:
a first detector that receives the filtered signal and provides a first detected value signal;
a second detector that receives the input signal and provides a second detected value signal; and
a comparator that receives the first detected value signal and the second detected value signal and provides the cut-off frequency control signal.

19. The device of claim 18, wherein the means for filtering further comprises:
a first multiplier that receives and multiplies the input signal and a multiplier value less than one, and provides a product signal indicative thereof.

20. The device of claim 14, wherein the means for filtering further comprises:
means responsive to the cut-off frequency control signal, for attenuating signal components beyond the bandwidth of useful signal components within the input signal, and for providing the filtered signal.

21. The device of claim 20, wherein the means for attenuating comprises a low pass filter having a dynamically adjustable cut-off frequency at about 15 kHz.

22. The device of claim 21, wherein the means for processing comprises:
a bandpass filter that receives the input signal and provides a bandpassed signal;
a detector that receives the bandpassed signal and provides a detected value signal; and
a comparator that receives the detected value signal and a threshold signal and provides the detected noise signal indicative thereof.

23. The device of claim 22, wherein the bandpass filter has a pass band located between about 17 kHz and 31 kHz.

24. The device of claim 14, wherein the means for filtering comprises a ramp circuit that provides a smooth transition of the output signal when switching the output signal between the input signal and the filtered signal.

25. A method for detecting and suppressing noise, comprising:
processing an input signal to determine if the input signal contains noise, and providing a detected noise signal indicative of whether or not noise is detected in the input signal;
filtering the input signal with a filter having a cut-off frequency to provide a filtered signal such that the output signal is equal to the filtered signal when the detected noise signal indicates the presence of noise; and
processing the input signal and the filtered signal, to provide a dynamically adjusted cut-off frequency control signal that controls the cut-off frequency.

26. The method of claim 25, wherein the step of processing the input signal and the filtered signal comprises:
  determining a first detected value indicative of the input signal;
  determining a second detected value indicative of the filtered signal; and
  comparing the first and second detected values to determine the cut-off frequency control signal.

27. The method of claim 26, wherein the step of filtering comprises filtering the input signal with a low pass filter.

* * * * *